(12) United States Patent
Robinson et al.

(10) Patent No.: US 11,634,932 B2
(45) Date of Patent: Apr. 25, 2023

(54) DOOR LOCKING MECHANISM

(71) Applicant: Eaton Intelligent Power Limited, Dublin (IE)

(72) Inventors: James Darryl Robinson, Greenwood, SC (US); Russell Irvin Boyce, Greenwood, SC (US); Christopher Harris Bridges, Saluda, SC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 967 days.

(21) Appl. No.: 16/395,924

(22) Filed: Apr. 26, 2019

(65) Prior Publication Data
US 2019/0249459 A1 Aug. 15, 2019

Related U.S. Application Data

(63) Continuation of application No. 15/882,304, filed on Jan. 29, 2018, now Pat. No. 10,301,849, which is a
(Continued)

(51) Int. Cl.
*E05C 9/24* (2006.01)
*E05B 17/00* (2006.01)
(Continued)

(52) U.S. Cl.
CPC ........ *E05B 65/001* (2013.01); *E05B 17/0025* (2013.01); *E05B 47/0012* (2013.01); *E05C 9/002* (2013.01); *E05C 9/063* (2013.01); *E05C 9/1808* (2013.01); *E05C 9/22* (2013.01); *E05F 15/40* (2015.01); *H02B 1/306* (2013.01); *H02B 1/38* (2013.01); *E05B 17/0029* (2013.01); *E05B 2047/0069* (2013.01); *E05C 9/185* (2013.01); *E05C 9/24* (2013.01); *H01H 3/30* (2013.01);
(Continued)

(58) Field of Classification Search
CPC ......... Y10T 292/0824; Y10T 292/0834; Y10T 292/0836; Y10T 292/0837; Y10T 292/0839; Y10T 292/084; Y10T 292/0846; Y10T 292/096; Y10T 292/1014; Y10T 292/1015; Y10T 292/1016; Y10T 292/42; Y10T 292/432; Y10S 292/51; Y10S 292/55; Y10S 292/68; E05B 17/0025; E05C 9/063; E05C 9/22; E05F 15/40
USPC ........................ 109/59 R, 59 T; 312/216, 222
See application file for complete search history.

(56) References Cited

U.S. PATENT DOCUMENTS 1,438,547 A * 12/1922 O'Connor ................. E05C 9/02
217/65
2,767,266 A 10/1956 Hawkins et al.
(Continued)

FOREIGN PATENT DOCUMENTS

DE 3300746 A * 11/1983 ............. E05B 65/46

*Primary Examiner* — Carlos Lugo
(74) *Attorney, Agent, or Firm* — Squire Patton Boggs (US) LLP

(57) ABSTRACT

A locking system for an enclosure, including a control bracket mounted to a door of the enclosure and configured to slide in a longitudinal direction along a guide rod running through a pin bracket of the control bracket. The control bracket further includes a latching pin to secure the door of the enclosure. A handle mechanism has a push rod that causes the control bracket to slide along the longitudinal direction, also causing the latching pin to move into a position that secures the door.

13 Claims, 10 Drawing Sheets

Related U.S. Application Data continuation of application No. 15/179,590, filed on Jun. 10, 2016, now Pat. No. 9,879,446.

(51) Int. Cl.

| | |
|---|---|
| *E05B 65/00* | (2006.01) |
| *E05C 9/18* | (2006.01) |
| *E05F 15/40* | (2015.01) |
| *E05B 47/00* | (2006.01) |
| *E05C 9/00* | (2006.01) |
| *E05C 9/06* | (2006.01) |
| *E05C 9/22* | (2006.01) |
| *H02B 1/30* | (2006.01) |
| *H02B 1/38* | (2006.01) |
| *H02B 13/025* | (2006.01) |
| *H01H 3/30* | (2006.01) |

(52) U.S. Cl.
CPC ....... *H02B 13/025* (2013.01); *Y10T 292/0824* (2015.04)

(56) References Cited

U.S. PATENT DOCUMENTS

| | | | |
|---|---|---|---|
| 3,175,873 A | 3/1965 | Blomquist et al. | |
| 3,913,263 A | 10/1975 | Butt | |
| 4,017,698 A | 4/1977 | Kuhn | |
| 4,192,535 A * | 3/1980 | Picard | E05C 9/045 |
| | | | 292/159 |
| 5,927,768 A * | 7/1999 | Dallmann | E05C 9/02 |
| | | | 292/336.3 |
| 6,039,364 A * | 3/2000 | Rieger | E05B 15/0006 |
| | | | 292/342 |
| 6,637,784 B1 | 10/2003 | Hauber | |
| 6,651,389 B2 * | 11/2003 | Minter | E05C 9/02 |
| | | | 292/DIG. 33 |
| 6,698,970 B2 * | 3/2004 | Guillemet | E05C 9/185 |
| | | | 403/374.1 |
| 6,746,092 B2 | 6/2004 | Leccia et al. | |
| 6,772,613 B2 * | 8/2004 | Webb | B25H 3/02 |
| | | | 70/164 |
| 7,049,516 B1 | 5/2006 | Haag | |
| 7,418,846 B2 * | 9/2008 | James | E05C 9/185 |
| | | | 70/164 |
| 8,020,950 B2 | 9/2011 | Reuter et al. | |
| 8,096,152 B2 * | 1/2012 | Wagh | E05C 9/02 |
| | | | 70/164 |
| 8,161,683 B2 * | 4/2012 | Van Parys | E05D 15/5205 |
| | | | 292/141 |
| 8,419,141 B2 * | 4/2013 | Niedzwiecki | E05C 9/1808 |
| | | | 312/216 |
| 8,576,568 B2 * | 11/2013 | Zhang | H05K 7/1489 |
| | | | 312/334.1 |
| 8,628,128 B2 * | 1/2014 | Sternberger | B64C 13/00 |
| | | | 292/302 |
| 8,960,815 B2 | 2/2015 | Karandikar et al. | |
| 9,879,446 B2 * | 1/2018 | Robinson | E05B 17/0025 |
| 11,242,703 B2 * | 2/2022 | Sims | E05C 9/063 |
| 2008/0148642 A1 | 6/2008 | Mathieu | |
| 2012/0194044 A1 | 8/2012 | Niedzwiecki | |
| 2013/0293076 A1 | 11/2013 | Karandikar | |
| 2014/0097734 A1 | 4/2014 | Gingrich | |
| 2016/0177603 A1 | 6/2016 | Sims et al. | |

\* cited by examiner

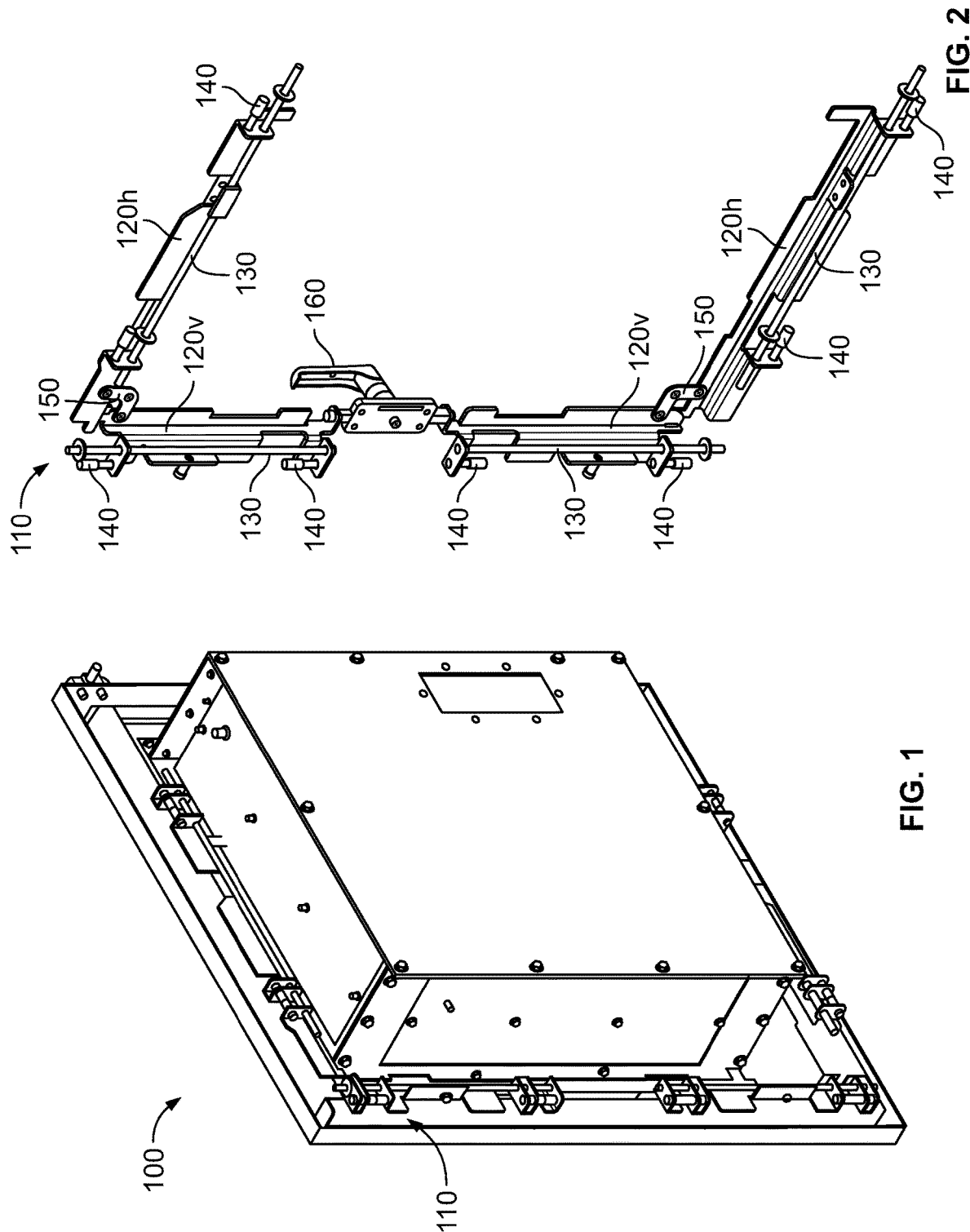

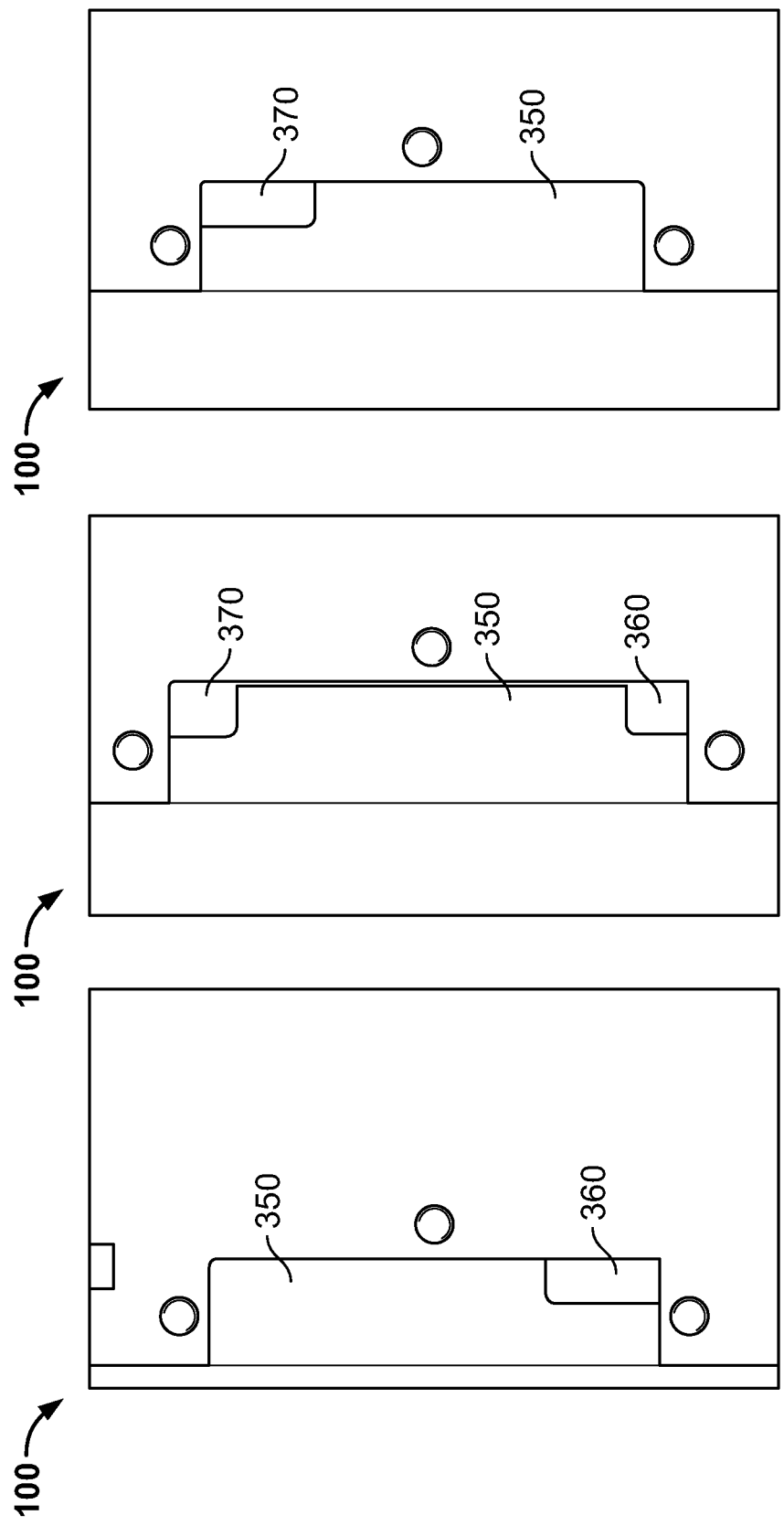

DOOR LOCKING MECHANISM

CROSS-REFERENCE TO RELATED APPLICATION

This application is a continuation of U.S. patent application Ser. No. 15/882,304, filed on Jan. 29, 2018, which in turn is a continuation of U.S. patent application Ser. No. 15/179,590, filed on Jun. 10, 2016 and issued as U.S. Pat. No. 9,879,446. The disclosures of these documents are incorporated by reference herein in their entirety.

FIELD OF INVENTION

This disclosure relates to locking mechanisms for doors. The disclosed locking mechanisms can be used for arc resistant switchgears for power distribution and control applications. The disclosure further relates to safety features for locking mechanisms.

BACKGROUND

Locking mechanisms for known enclosure systems require a door that can be sealed and locked. For example, such locking mechanisms are configured to be used underwater or in the upper atmosphere. In other examples, locking mechanisms can be used for switchgears. The term "switchgear" refers to a combination of one or more electrical disconnect switches, fuses, or circuit breakers. Switchgears can be housed within a contained enclosure to isolate components or groups of components. Switchgears may be used for control and distribution of medium voltage circuits, main-main automatic transfer, main-tie-main automatic transfer, main service disconnect and switching, protection of transformers, motors, generators, feeder circuits, and capacitor banks. In applications where switchgears are used, arc faults may occur between electrical connections, threatening safety of those nearby. An arc fault is a discharge of a high amount of electricity between two conductors, which creates large amounts of explosive heat called an arc blast. The arc blast can cause severe or even fatal injury to people in proximity of the switchgear, especially operators.

Favorable safety features include a latching system that ensures the switchgear enclosure is safely closed with minimal room for operator error, and indicators that alert an operator when the cabinet is not safely closed.

SUMMARY

In one embodiment, a locking system for an enclosure includes a control bracket having a main body defining a main body plane and a pin bracket defining a pin bracket plane. The control bracket is configured to slide along a control bracket axis in the main body plane. The main body plane is perpendicular to the pin bracket plane. The pin bracket has first and second through holes extending through the pin bracket. The locking system further includes a guide rod extending through the first through hole of the pin bracket and a latching pin extending through the second through hole of the pin bracket. The locking system also includes a locking flange adjacent the latching pin, a handle having a push rod configured to engage with the control bracket, and an indicator that provides a notification to a user when the latching pin has engaged the locking flange.

In another embodiment, a locking system for an enclosure includes a control bracket having a main body and a pin bracket. The pin bracket has first and second through holes extending through the pin bracket. The locking system further includes a guide rod extending through the first through hole of the pin bracket and a latching pin extending through the second through hole of the pin bracket. The locking system also includes a roller rotatably connected to the control bracket and a cam bracket. The cam bracket includes a two-stage cam having a ramp portion and a plateau portion, configured to receive the roller. The locking system further includes an indicator that provides a notification corresponding to whether the roller is engaged with the plateau portion, the ramp portion, or not in contact with the two-stage cam.

In yet another embodiment, a locking system for an enclosure has an enclosure opening on one side and a locking flange having a locking flange through hole extending therethrough. The locking system includes a door hingedly attached to the enclosure at a side of the enclosure opening and a control bracket mounted to the door and configured to slide along a control bracket axis. The locking system further includes a handle and a handle mechanism mounted to the door. The handle mechanism is configured to cause the control bracket to slide along the control bracket axis when the handle is rotated. The locking system also includes a two-stage cam mounted to the enclosure. The two-stage cam has a ramp portion leading to a plateau portion. The locking system also includes a roller rotatably mounted to the control bracket and configured to engage the ramp portion and the plateau portion of the two-stage cam. The locking system further includes a latching indicator that provides a notification that the door is securely closed when the roller is in contact with the plateau portion of the two-stage cam.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 1 is an isometric view of one embodiment of the inside of a door;

FIG. 2 is an isometric view of the control brackets, handle, and pins used for the door of FIG. 1;

FIGS. 12A-12C are detail views of one embodiment of a visual indicator in various positions;

DETAILED DESCRIPTION

Figure 3:
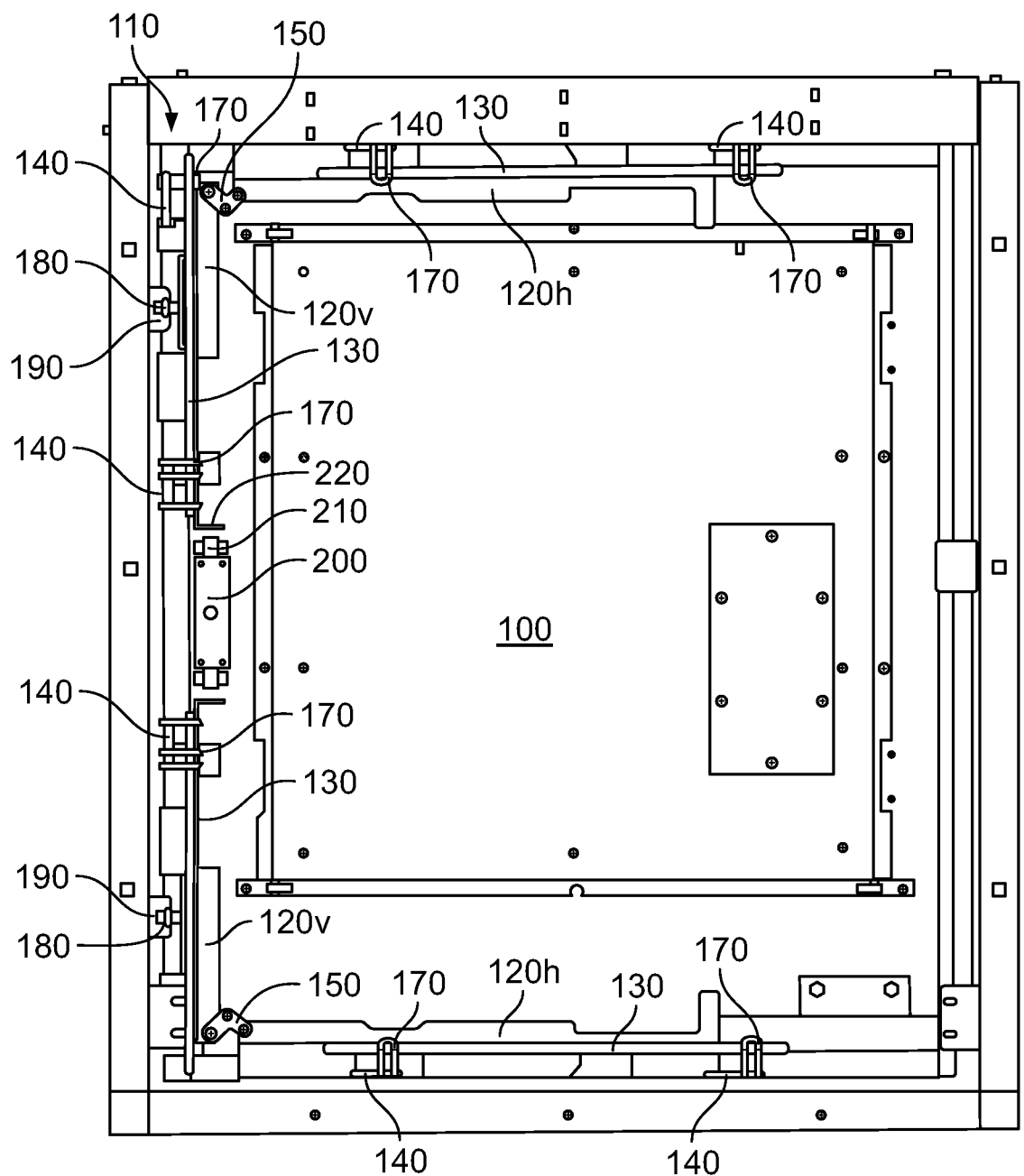
FIG. 3 is a perspective view of the inside of the door of FIG. 1.

FIG. 1 shows the back side of the fully assembled door 100 with locking system 110 installed. Door 100 can be used for a number of enclosures, for example: a safe, an underwater enclosure, an upper atmosphere enclosure, or any other type of enclosure where a tight locking seal is required. Switchgears contain volatile and sensitive electrical components, and require such a tight locking seal to prevent operator injury. While not shown in the drawings, the switchgear door 100 is hingedly connected to a switchgear enclosure (also referred to as an enclosure) that contains one or more electrical components. The enclosure can contain, for example, electrical disconnect switches, fuses, or circuit breakers. Locking system 110, when properly engaged, seals the door to the switchgear enclosure sufficiently to meet the IEEE standards C37.20.2 and C37.20.7.

FIG. 2 shows the locking system 110 in isolation from the door 100. Locking system 110 includes control brackets 120, guide rods 130, pins 140, force transfer brackets 150, and handle 160. FIG. 3 shows the locking assembly 110 installed on door 100. The door 100 and locking system 110 will be described below with respect to FIGS. 1-3.

In the illustrated embodiment, four control brackets 120 are provided, each control bracket 120 having two latching pins 140. Control brackets 120 can be formed of sheet metal, or molded metal in alternative embodiments. The control brackets 120 can be stamped, laser cut, or punched from sheet metal. Latching pins 140 are made of steel of sufficient properties to withstand the expected forces applied to the door 100.

In alternative embodiments, the latching pins can be plastic or composite materials, depending on the parameters for the specific application.

Control brackets 120 are mounted to door 100 and slide along their respective control bracket axes, which are defined as a longitudinal axis of each control bracket 120. The two control brackets 120v adjacent to handle 160 are shown as being oriented in a vertical direction, and are therefore referred to as vertical control brackets 120v. The longitudinal axes of the vertical control brackets 120v extend from the top of FIG. 2 to the bottom of the FIG. 2.

The remaining two control brackets 120h are shown as being oriented in a horizontal direction, and are therefore referred to as horizontal control brackets 120h. The longitudinal axes of the horizontal control brackets 120h extend perpendicular to the longitudinal axes of the vertical control brackets 120v. The vertical control brackets 120v are configured to slide vertically along their longitudinal axes, while the horizontal control brackets 120h are configured to slide horizontally along their longitudinal axes. It should be understood that the terms "vertical" and "horizontal" are merely used for convenience to describe the components as they are oriented in this illustrated embodiment. The door 100 and its components may be mounted in any desirable orientation.

Control brackets 120 are mounted to the door via the guide rods 130, which are fixed to the door 100, and force transfer brackets 150, which are pivotally fixed to the door. Alternative methods for attaching the control brackets 120 include using spacers with screws or brackets with slots to guide the control brackets 120 along their longitudinal axes with respect to the door 100.

In alternative embodiments (not shown), a different number of control brackets, such as three or five, may be used instead of four control brackets. In other alternative embodiments (not shown), a single guide rod can be used to connect the two vertically oriented control brackets. In other alternative embodiments (not shown), some or all of the control brackets can include a different number of latching pins, such as one or three latching pins. The number of latching pins may affect whether the door meets the IEEE standards referenced above.

The two control brackets 120v mounted vertically, as seen in FIGS. 1 and 2, may each have a separate guide rod 130 or a common guide rod (not shown). The control brackets 120h oriented horizontally along a top and bottom edge of door 100 each have their own guide rod 130. The guide rods 130 are fixed with respect to the door and latching pins 140 are fixed with respect to control brackets 120h, 120v, and move with their respective control brackets 120.

The locking system 100 is controlled by a handle mechanism 200. The handle mechanism 200 contains gears that cause push rods 210 to be extended or retracted when handle 160 is turned. Push rods 210 are fixed to push extension 220 located on the vertical control brackets 120v. When handle 160 is turned in a first direction, the push rods 210 extend and push the push extensions 220 and the vertical control brackets 120v away from the handle mechanism 200. When handle 160 is turned in a second direction opposite the first direction, the push rods 210 retract, causing the vertical control brackets 120v to move towards the handle mechanism 200.

In other alternative embodiments (not shown), the handle mechanism can be replaced with any other mechanical structure that effect a movement of the control brackets 120, such as a cam assembly or other linkage.

Force transfer brackets 150 in this embodiment take the shape of right angles, and are pivotally connected at three points, as can best be seen in FIG. 3. A first end of the transfer bracket 150 is pivotally connected to a vertical control bracket 120v and a second end of the transfer bracket 150 is pivotally connected to an adjacent horizontal control bracket 120h. The elbow of the force transfer bracket 150 is pivotally connected to the door 100. Thus, when the vertical control bracket 120v translates in the vertical direction, it pushes or pulls the first end of the transfer bracket 150, causing the force transfer bracket 150 to pivot about its elbow. The pivoting of the force transfer bracket 150 about its elbow causes the second end of the force transfer bracket 150 to push or pull the horizontal control bracket 120*h*. Force transfer bracket 150 can be connected to the control brackets 120*h*, 120*v* by pins, bolts, or any other fastener that permits a pivotal movement.

In alternative embodiments (not shown), other fasteners can be used to translate the vertical movement of the vertically oriented control brackets into a horizontal movement of the horizontally oriented control brackets. Such alternative fasteners may include linkages or gear assemblies.

Latching pins 140 and guide rods 130 are configured to extend into U-shaped brackets 170 via through holes located in the U-shaped brackets 170. U-shaped brackets 170 are mounted to the door 100, with the through holes being aligned with guide rods 130 and latching holes 140. Guide rods 130 extend through the through holes in U-shaped brackets 170, and are not withdrawn from the through holes as the respective control bracket 120 moves. Latching pins 140 can be inserted and withdrawn from the through holes in respective U-shaped brackets 170 as the control brackets 120*h*, 120*v* are moved along their respective longitudinal axes.

Rollers 180 are rotatably connected to the two vertically oriented control brackets 120*v* via a spindle. Rollers 180 each have a cylindrical contact portion that is configured to be engaged with a two-stage cam 190 mounted to the enclosure, when vertical control brackets 120*v* are moved along their control bracket axes. Rollers 180 can be made from bronze, plastic, or any other material that permits it to roll along two-stage cam 190.

Figure 4:
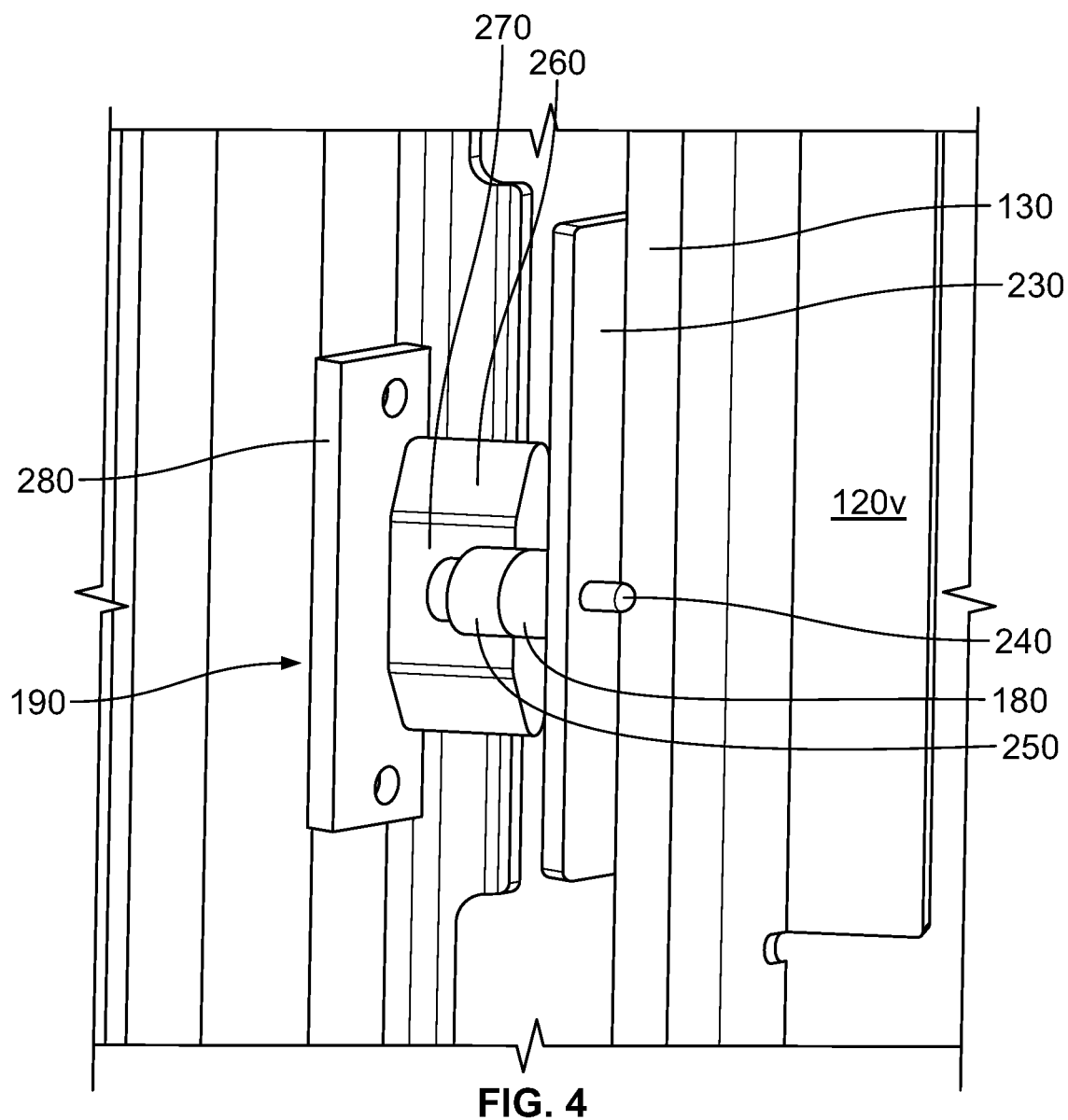
FIG. 4 is a detail view of one embodiment of a roller and cam for the door of FIG. 1.

A more detailed view of the roller 180 and cam 190 is shown in FIG. 4. Control bracket 120*v* includes a roller flange 230 that extends towards an interior of the enclosure. Roller 180 is rotatably mounted to roller flange 230 via a spindle 240 that extends into a through hole in roller flange 230. Roller 180 also includes a contact portion 250 that is designed to be in contact with, and roll along, portions of cam 190.

Cam (also referred to as cam bracket) 190 includes a ramped portion 260, a plateau portion 270, and a fixing portion 280. The ramped portion 260 and plateau portion 270 are designed to engage with the contact portion 250 of roller 180. Fixing portion 280 connects the cam 190 to an inner side of the enclosure, in close proximity to the enclosure opening. In this embodiment, fixing portion 280 has two through holes that receive bolts or screws (not shown) to connect cam 190 to the enclosure. In alternative embodiments (not shown), the fixing portion 280 can be connected to the enclosure with an adhesive, can be welded on, or can be made integral with the enclosure. In other alternative embodiments (not shown) the cam can include just a ramped portion, and omit the plateau portion.

When vertical control brackets 120*v* are moved along the vertical axis, the roller 180 is moved from a first position where it is not in contact with the cam 190 to a second position where it is engaged with the ramped portion 260. When the cam 190 is in the second position, the door 100 moves into contact with the gasket around the periphery of the enclosure opening. As the roller 180 moves up the ramped portion 260, the roller 180 moves inward toward the enclosure, drawing in the control bracket 120*v* and door 100, which are fixed with the roller 180. As the roller 180 moves farther up the ramped portion 260, the door compresses the gasket until it forms a seal. In one embodiment, the door compresses the gasket, to seal the door, sufficiently to prevent gasses from escaping the enclosure during an arc fault. The cam 190 and U-shaped bracket 170 are configured such that when the roller 180 reaches the plateau portion 270, the latching pins 140 (which move linearly with roller 180 by virtue of both being fixed to the control bracket 120*v*) move into and through the through holes of the U-shaped brackets 170 and through the locking flange 340 (as seen in FIGS. 6A-9C), securing the door 100.

Figure 5A:
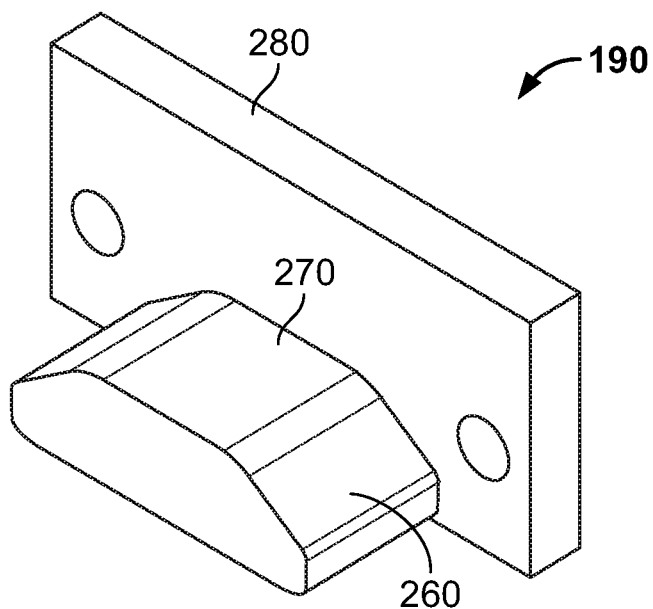
FIGS. 5A-5C are perspective, top, and front views of the cam of FIG. 4, respectively.
Figure 5B:
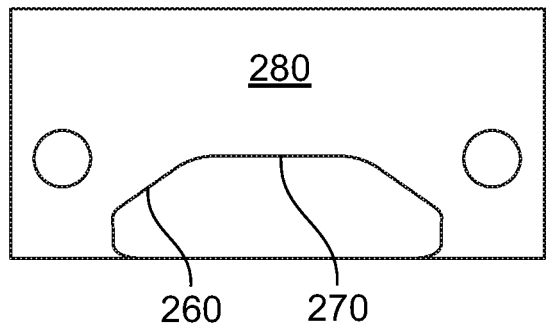
Figure 5C:
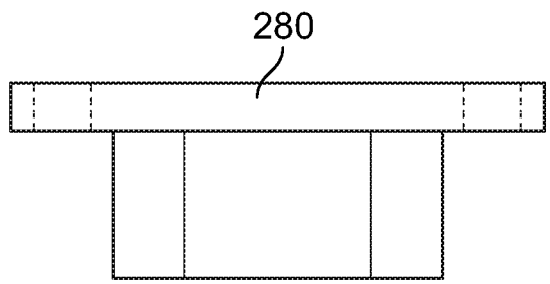

FIGS. 5A-5C illustrate various views of the cam 190, including the fixing portion 280, the ramped portion 260, and the plateau portion 270. FIG. 5A is an isometric view, FIG. 5B is a front perspective view, and FIG. 5C is a top perspective view.

Figure 8A:
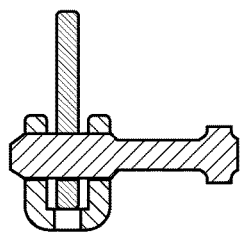
FIG. 8A is a top view of a U-shaped bracket and locking flange according to the embodiment of FIG. 1, shown at a time when the roller is engaged with a middle of the plateau portion of the cam.
Figure 7A:
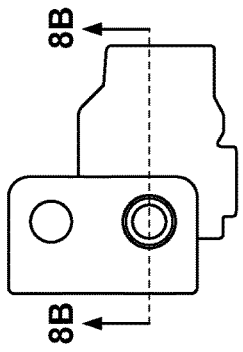
FIG. 7A is a top view of a U-shaped bracket and locking flange according to the embodiment of FIG. 1, shown at a time when the roller is engaged with an edge of a plateau portion of the cam.
Figure 6A:
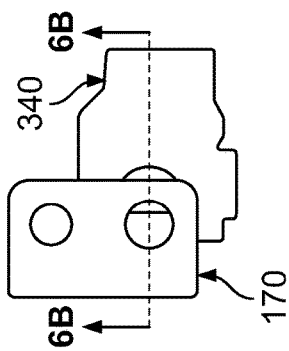
FIG. 6A is a top view of a U-shaped bracket and locking flange according to the embodiment of FIG. 1, shown at a time when the roller is not engaged with the cam.
Figure 8B:
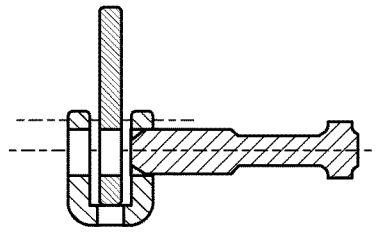
FIG. 8B is a cross sectional view of a U-shaped bracket, locking flange, and latching pin according of FIG. 8A.
Figure 7B:
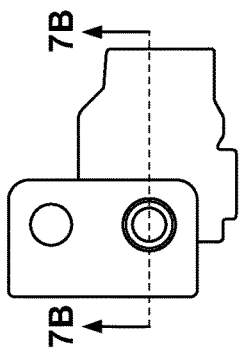
FIG. 7B is a cross sectional view of a U-shaped bracket, locking flange, and latching pin of FIG. 7A.
Figure 6B:
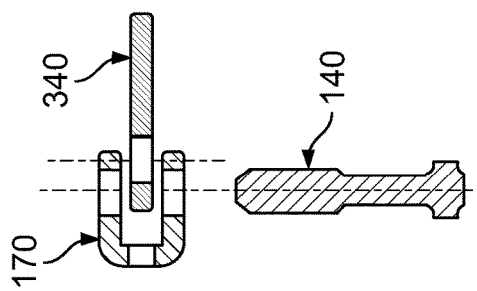
FIG. 6B is a cross sectional view of a U-shaped bracket, locking flange, and latching pin of FIG. 6A.
Figure 9C:
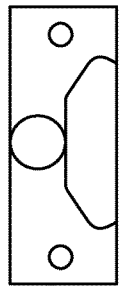
FIG. 9C is a front view of the cam and roller corresponding to the embodiment of FIGS. 8A and 8B.
Figure 9B:
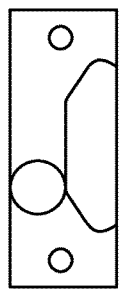
FIG. 9B is a front view of the cam and roller corresponding to the embodiment of FIGS. 7A and 7B.
Figure 9A:
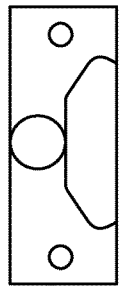
FIG. 9A is a front view of the cam and roller corresponding to the embodiment of FIGS. 6A and 6B.

FIGS. 6A, 7A, and 8A illustrate top views of the components involved with latching the door during the stages of the latching process. FIGS. 6B, 7B, and 8B are the cross section views along lines 6B, 7B, 8B, respectively, of the bracket 170, locking flange 340, and latching pin 140 during stages corresponding to those shown in FIGS. 6A, 7A, and 8A. FIGS. 9A, 9B, and 9C are front views of the roller 180 and cam 190 during stages corresponding to those shown in FIGS. 6A, 7A, and 8A, respectively.

The stages are caused by a user turning handle 160 to move the components as described above. FIG. 9A illustrates the cam 190 at a stage where the roller 180 is disengaged from the cam 190. At this stage, the through hole of locking flange 340 is misaligned with the through holes in the U-shaped bracket 170, and the latching pin 140 is completely removed from the through holes of U-shaped bracket 170, as seen in FIGS. 6A and 6B. At this stage, the door 100 has not fully compressed the gasket of the enclosure (which is effected via the roller 180 rolling up ramped portion 260), so the distance between the door 100 and enclosure opening is greater than what the distance will be when the door 100 is locked.

FIG. 9B illustrates the same view during the stage where the roller 180 is in contact with ramped portion 260 of cam 190. At this stage, the through holes of the locking flange 340 and U-shaped bracket 170 are aligned, and the latching pin 140 extends through just one through hole of the U-shaped bracket 170, as seen in FIGS. 7A and 7B. In alternative embodiments (not shown), the latching pin 140 could be entirely outside of the through holes of U-shaped bracket 170 at this stage, if desired.

FIG. 9C illustrates the same view during the stage where the roller 180 is in contact with plateau portion 270 of cam 190. At this stage, the through holes of locking flange 340 are aligned with the through holes of U-shaped bracket 170, and the latching pin 140 extends through the through holes of both the locking flange 340 and the U-shaped bracket 170, as seen in FIGS. 8A and 8B. At this stage, the door 100 is securely locked and the enclosure is sealed.

Figure 10A:
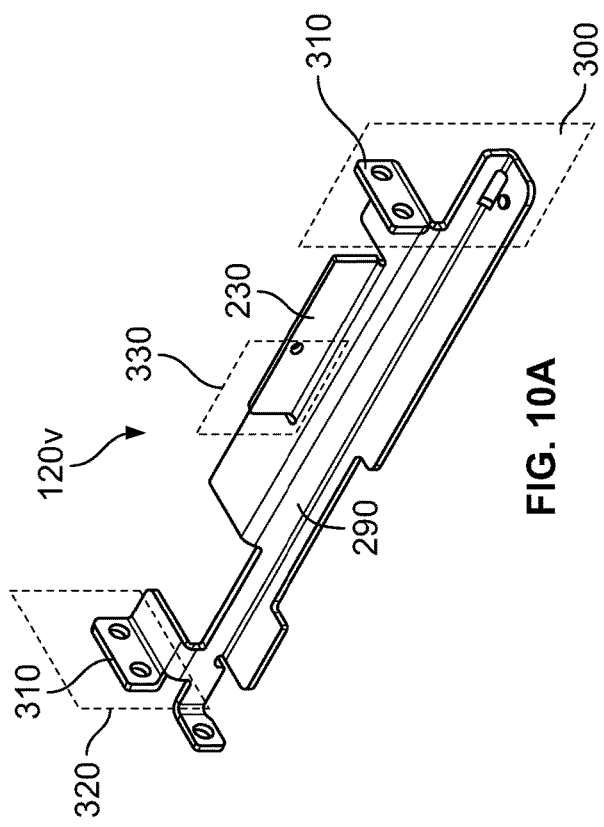
FIGS. 10A-10D are isometric views of exemplary metal control linkages for the door of FIG. 1.
Figure 10B:
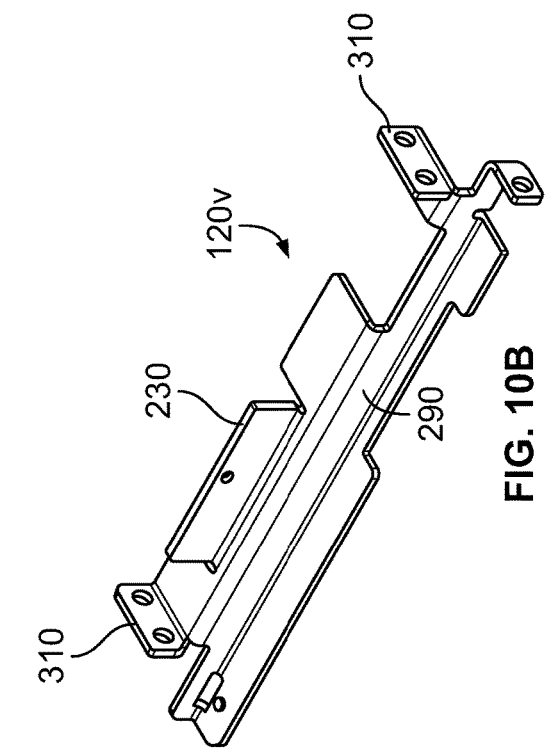
Figure 10C:
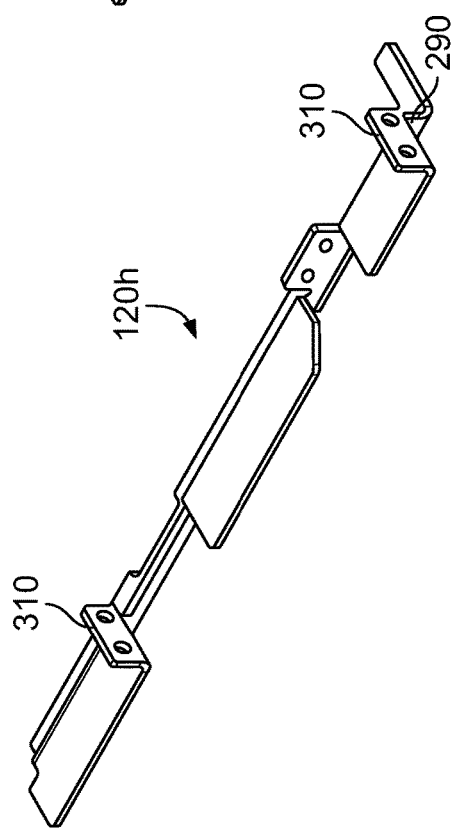
Figure 10D:
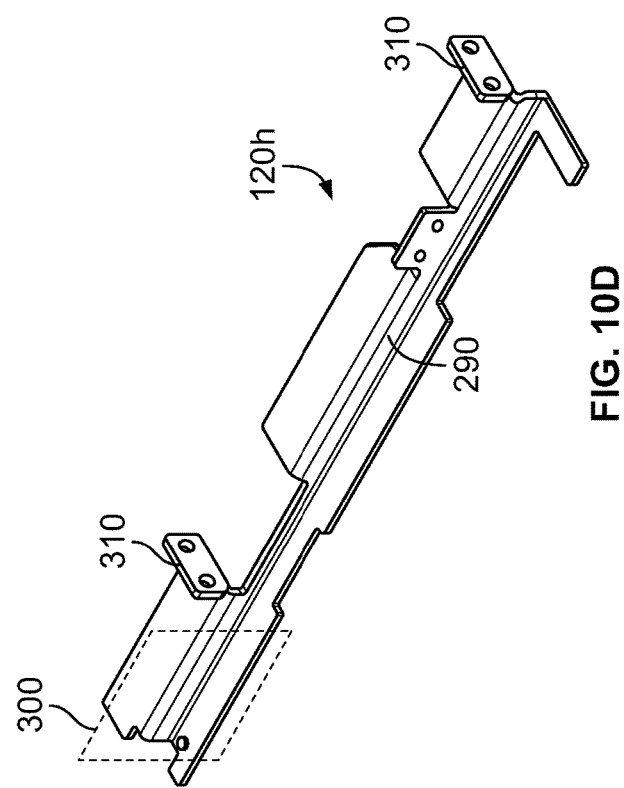

FIGS. 10A-10D illustrate isometric views of four exemplary embodiments of control brackets 120*v*, 120*h*. FIGS. 10A and 10B are the vertically aligned control brackets 120*v*, having roller flanges 230 as discussed above. The vertically oriented control brackets 120*v* (in FIGS. 10A and 10B) further each include a main body portion 290 that is parallel to the respective roller flange 230. The main body portions 290 of vertically aligned control brackets 120*v* define main body planes 300. The horizontally aligned control brackets 120*h*, shown in FIGS. 10C and 10D, also include main body portions 290 that define main body planes 300.

All control brackets 120 include pin brackets 310, each pin bracket 310 having two through holes to receive a latching pin 140 and a guide rod 130. The pin brackets 310 define a pin bracket plane 320, which is perpendicular to main body plane 300. The roller flange 230 further defines a roller flange plane 330, which is parallel to the main body plane 300 and perpendicular to the pin bracket plane 320.

Figure 11A:
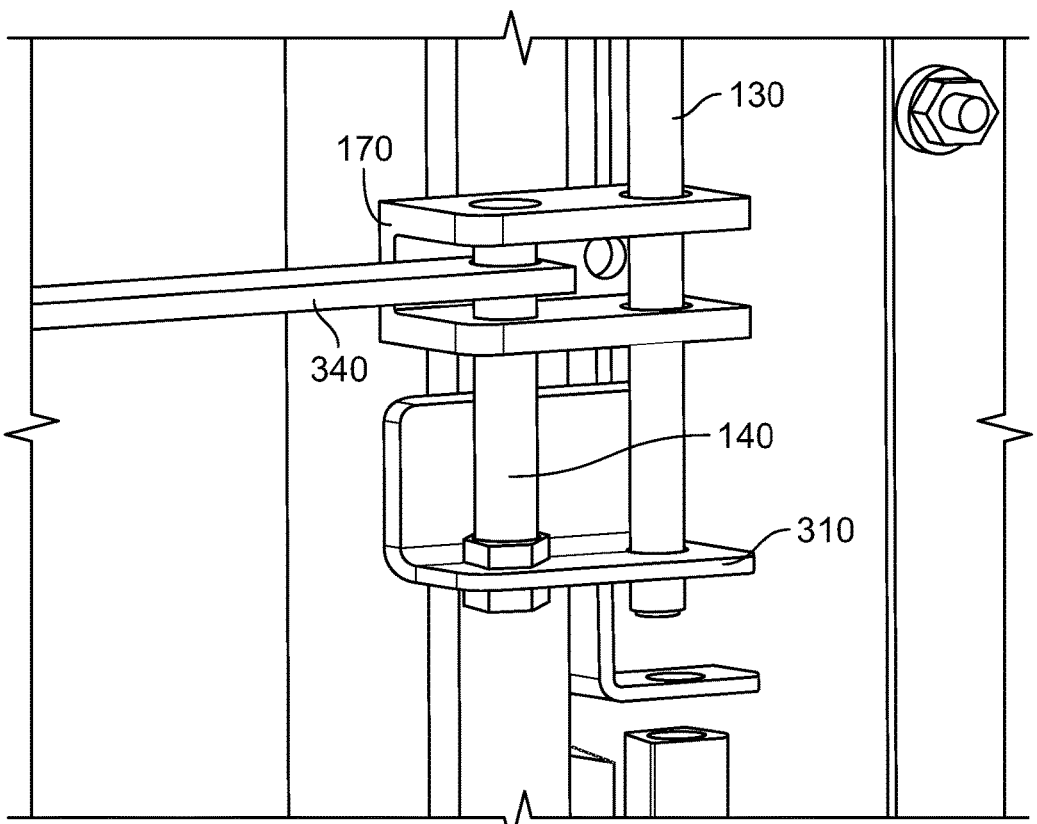
FIG. 11A is a detail view of one embodiment of a latching pin and guide rod in a latched.

FIG. 11A illustrates a detail view of the guide rod 130 and latching pin 140 fixed to the pin bracket 310 and extending through the U-shaped bracket 170 in a latched position. In this position, the U-shaped bracket 170 is positioned around locking flange 340, and the latching pin 140 extends through a through hole in locking flange 340 as well as through the two through holes of U-shaped bracket 170. The locking flange 340 is fixed to the enclosure, and thus prevents the door 100 from opening when latching pin 140 extends therethrough.

Figure 11B:
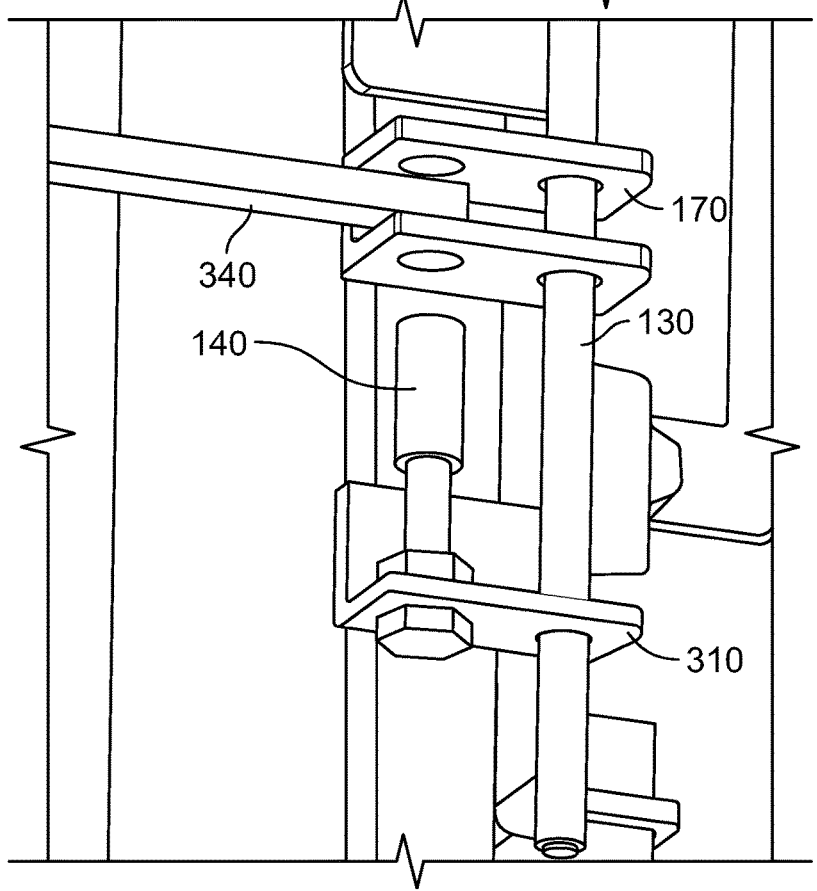
FIG. 11B is a detail view of the latching pin and guide rod of FIG. 11A in an unlatched position.

FIG. 11B illustrates the same detail, but in a position where the latching pin 140 is disengaged from the U-shaped bracket 170, corresponding to an open position of the handle 160.

FIGS. 12A-12C depict an embodiment for an indicator assembly for use with the system (or any alternatives of the system) described above. The indicator assembly in this embodiment includes a transparent window 350, located in the door 100 near a control bracket 120v, and two tags 360, 370 that indicate whether the door is fully latched. Transparent window 350 can be made from polycarbonate, or alternatively safety glass. The tags 360, 370 are affixed to the control bracket 120, and are spaced apart so that the first tag 360 is displayed when the control bracket 120v is in a position where the roller 180 is not engaged with cam 190, corresponding to a configuration where the door 100 is unsecured. This stage is shown in FIG. 12A. Both tags 360, 370 are partially visible through the window 350 when the control bracket 120v is in a position where the roller 180 is engaged with the ramped portion 260 of cam 190, but before the door 100 is fully and securely latched. This stage is shown in FIG. 12B. In this configuration, a user may not be able to tell that the door 100 isn't fully latched by pulling on it—the door 100 may remain closed if a user exerts a pulling force on the handle 160, but the door 100 at this stage is not secured according to IEEE standards C37.20.2 and C37.20.7. FIG. 12C depicts a configuration where the roller 180 is engaged with the plateau portion 270 of cam 190, which corresponds to a stage where the latching pin 140 extends through the through holes of U-shaped bracket 170 and the through hole of locking flange 340. These indicators notify a user when the door is securely fastened according to the IEEE standards.

Figure 13B:
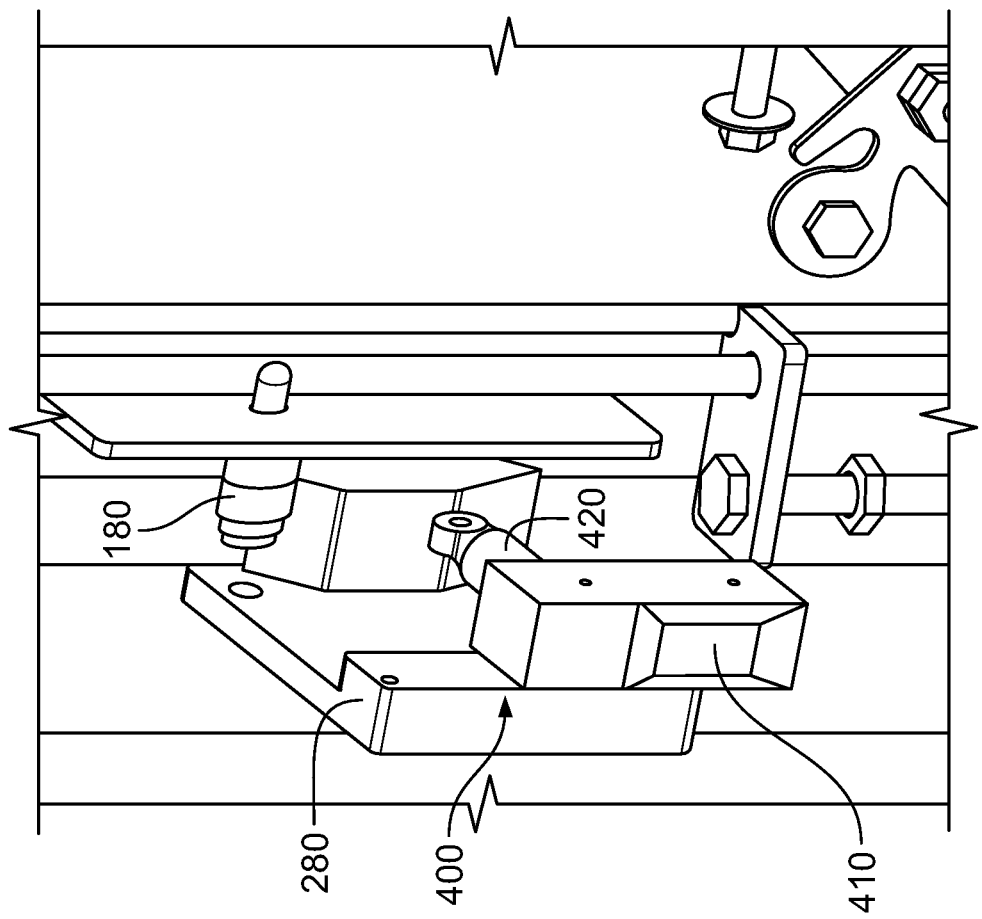
FIGS. 13A and 13B are detail views of an electronic indicator that can be used with the door of FIG. 1.
Figure 13A:
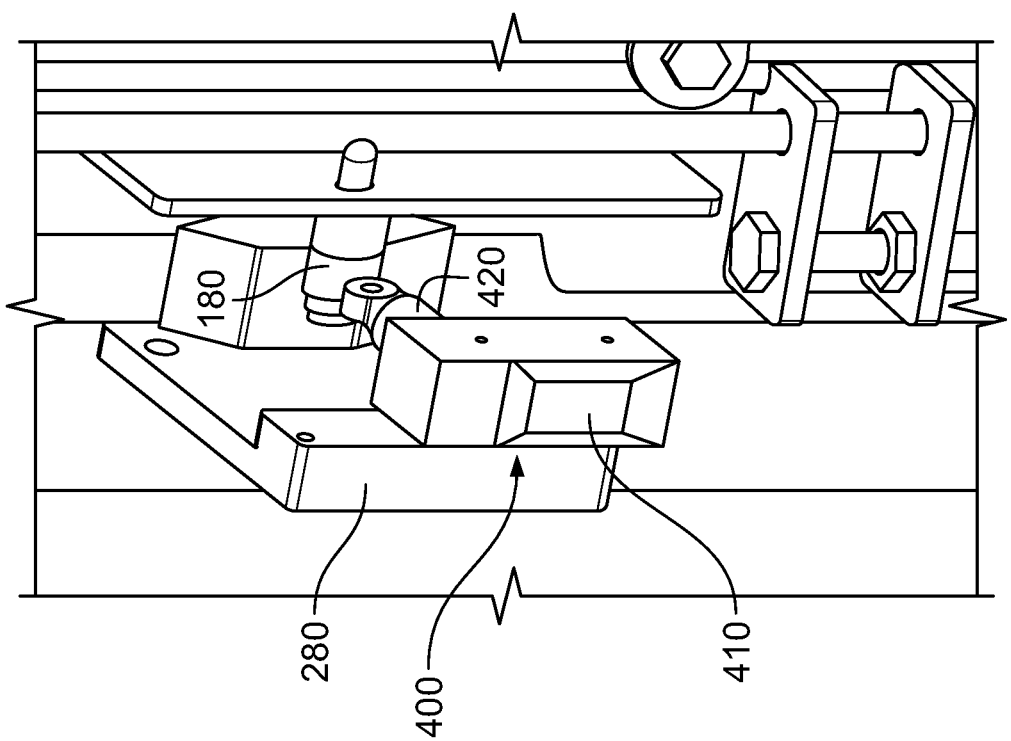

FIGS. 13A and 13B depict an alternative indicator assembly for use with the door disclosed above. The indicator assembly depicted in FIGS. 13A and 13B comprises a microswitch 400 having a microswitch body 410 and a sensor 420. The microswitch body 410 is mounted on fixing portion 280 of cam 190, set at a location where the roller 180 contacts sensor 420 when it is engaged with the plateau portion 270 of cam 190. When the roller 180 contacts sensor 420, the sensor 420 is physically moved inwards into microswitch body 410. Electronics (such as a processor or integrated circuit) within microswitch body 410 respond to the movement of sensor 420 and send a corresponding signal that notifies the user of the closure status of the door 100. The signal may be transmitted through wires, or it may be a wireless signal. In one embodiment, the signal is sent to a display connected to the door or the enclosure. Exemplary displays include, without limitation, light emitting diodes, LCD screens, and touch screens. In an alternative embodiment, the signal is sent to an external computer. Exemplary computers include, without limitation, laptop computers, desktop computers, mainframes, cell phones, smartphones, and tablets.

In alternative embodiments (not shown), a different microswitch can be used to detect the position of the roller, such as one that omits a sensor that physically comes into contact with the roller. Such a microswitch could, for example, include a radio frequency identification ("RFID") sensor that detects an RFID tag located within the roller when the roller comes in close proximity to the RFID sensor.

Figure 14:
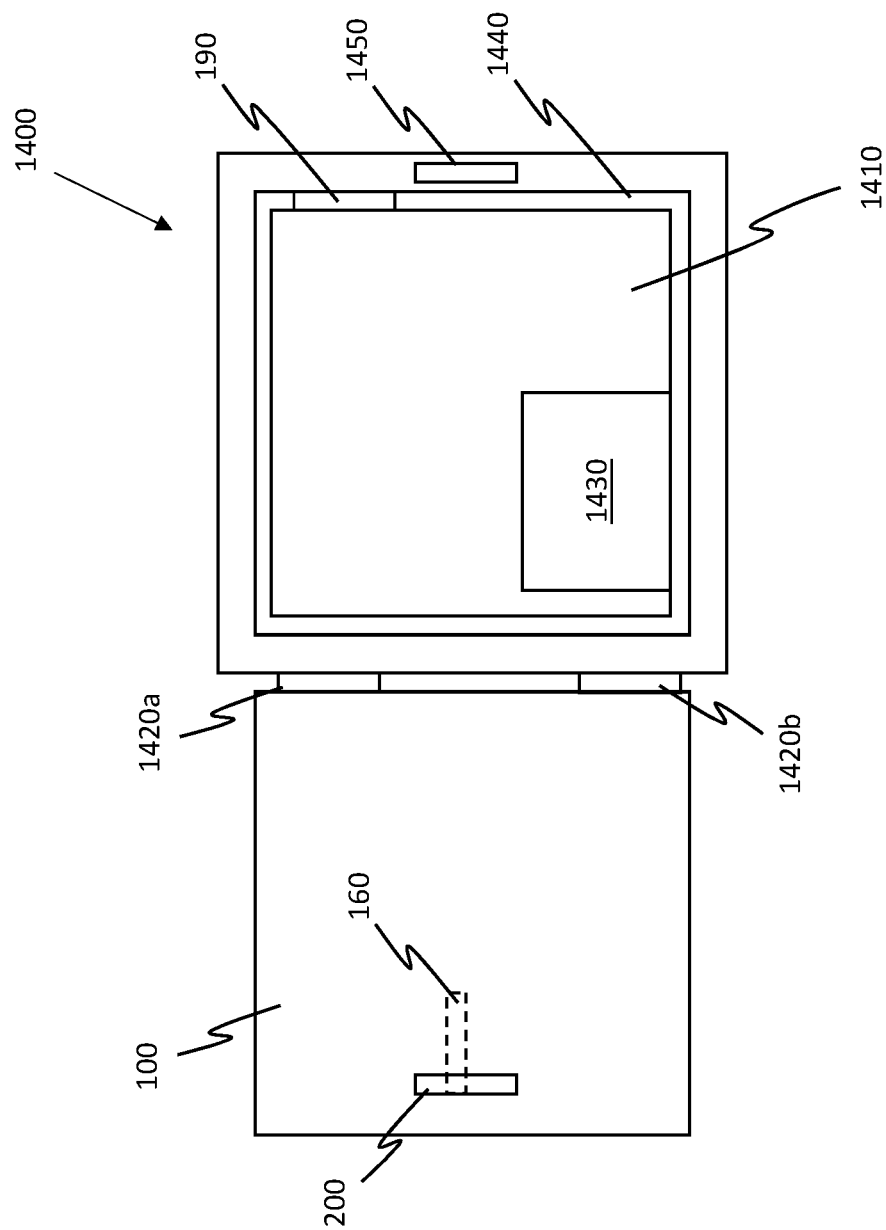
FIG. 14 is a schematic drawing of one embodiment an enclosure having an opening.

FIG. 14 is a schematic drawing illustrating an enclosure 1400 having an enclosure opening 1410 on one side. A door 100 (such as the door illustrated in FIG. 1) is hingedly attached to the enclosure 1400 by hinges 1420a,b at one side of the enclosure opening 1410. A handle 160 (such as the handle illustrated in FIG. 2) and a handle mechanism 200 (such as the handle mechanism illustrated in FIG. 3) are mounted to the door 100. A two-stage cam 190 (such as the two-stage cam illustrated in FIG. 3) is mounted to the enclosure 1400. One or more electrical components 1430 are located inside the enclosure 1400. A gasket 1440 is mounted along a periphery of the enclosure opening 1410. The door 100 compresses the gasket 1440 when a roller is moved up a ramp portion of the two-stage cam 190, such as shown in FIGS. 9A-B. The enclosure 1400 further includes a latching indicator 1450 that provides a notification that the door is securely closed when the roller is in contact with a plateau portion of the two-stage cam 190, as further described above with respect to FIGS. 12A-C.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A locking system for a device having an enclosure and a door, the locking system comprising:
    an enclosure having an enclosure opening on one side, wherein the enclosure has a locking flange proximate to the enclosure opening, the locking flange having a locking flange through hole extending therethrough;
    a door hingedly attached to the enclosure at a side of the enclosure opening;
    a control bracket mounted to the door and configured to slide along a control bracket axis, wherein the control bracket is made from a single piece of formed sheet metal, wherein the single piece of formed sheet metal forms a main body portion having a first end and a second end, wherein the control bracket includes a roller flange that is parallel to the main body of the control bracket, and wherein the roller flange is a flange having a roller rotatably mounted thereon, the roller being congfigured to engage a structure of the enclosure to ensure contact between the door and the enclosure;

a handle and a handle mechanism mounted to the door, wherein the handle mechanism is configured to cause the control bracket to slide along the control bracket axis when the handle is rotated; and a latching pin mounted to the control bracket, and configured to selectively engage the locking flange through hole when the control bracket slides along the control bracket axis.

2. The locking system of claim 1, further comprising:

a two-stage cam mounted to the enclosure, the two-stage cam having a ramp portion leading to a plateau portion, wherein the roller is configured to engage the ramp portion and plateau portion of the two-stage cam.

3. The locking system of claim 2, further comprising a gasket mounted along a periphery of the enclosure opening, and wherein the door compresses the gasket when the roller is moved up the ramp portion of the two-stage cam.

4. The locking system of claim 2, further including a latching indicator that provides a notification that the door is securely closed when the roller is in contact with the plateau portion of the two-stage cam.

5. The locking system of claim 1, further including a guide rod mounted to the control bracket, wherein the guide rod defines a guide rod axis and wherein the latching pin defines a latching pin axis, and wherein the guide rod axis is parallel to the control bracket axis and parallel to the latching pin axis.

6. The locking system of claim 5, wherein the locking flange is configured to fit between the two parallel flanges of the U-shaped bracket, and wherein the locking flange through hole is configured to align with the two U-shaped bracket through holes.

7. The locking system of claim 5, wherein the latching pin is configured to extend through the two U-shaped bracket through holes and the locking flange through hole when the door is closed and the handle is turned.

8. The locking system of claim 1, further comprising a U-shaped bracket mounted to the door, wherein the U-shaped bracket has two parallel flanges that each include two U-shaped bracket through holes extending therethrough.

9. The locking system of claim 1, wherein the control bracket is a first control bracket, and wherein the locking system further includes a second control bracket and a force transfer bracket, and wherein a first end of the force transfer bracket is pivotally connected to the first control bracket and a second end of the force transfer bracket is pivotally connected to the second control bracket.

10. The locking system of claim 9, wherein the force transfer bracket translates a motion of the first control bracket along the control bracket axis of a main body plane into a motion of the second control bracket along a second axis perpendicular to the control bracket axis.

11. The locking system of claim 1, wherein the at least two pin brackets includes a first pin bracket located at the first end of the main body.

12. The locking system of claim 11, wherein the at least two pin brackets includes a second pin bracket spaced from the second end of the main body.

13. The locking system of claim 1, wherein the single piece of formed sheet metal forms at least two pin brackets, with each pin bracket being perpendicular to the main body portion.

* * * * *